United States Patent [19]
Joffre et al.

[11] Patent Number: 5,708,070
[45] Date of Patent: Jan. 13, 1998

[54] SILICONE EMULSIONS WHICH CROSSLINK BY MICHAEL ADDITION REACTIONS

[75] Inventors: Eric Jude Joffre; Donald Taylor Liles, both of Midland, Mich.; David Logan Murray, Fall Branch, Tenn.; Anthony Revis, Freeland, Mich.

[73] Assignee: Dow Corning Corporation, Midland, Mich.

[21] Appl. No.: 575,315

[22] Filed: Dec. 20, 1995

[51] Int. Cl.$^6$ .................................................. C08K 3/26
[52] U.S. Cl. ........................ 524/425; 524/447; 524/457; 524/588; 524/788; 524/789; 524/837; 524/862
[58] Field of Search .................................. 524/837, 862, 524/788, 789, 588, 457, 447, 425

[56] References Cited

U.S. PATENT DOCUMENTS

| | | | |
|---|---|---|---|
| 5,066,667 | 11/1991 | Ehrenfreund et al. | 514/381 |
| 5,068,359 | 11/1991 | Huxley et al. | 549/58 |
| 5,082,873 | 1/1992 | Liles | 522/86 |
| 5,085,694 | 2/1992 | Cifuentes | 106/3 |
| 5,089,537 | 2/1992 | Liles | 522/84 |
| 5,243,069 | 9/1993 | Emmans | 560/224 |

FOREIGN PATENT DOCUMENTS 0578893  1/1994  European Pat. Off. .

*Primary Examiner*—Karen A. Dean
*Attorney, Agent, or Firm*—Patricia M. Scaduto

[57] ABSTRACT

An aqueous silicone emulsion which crosslinks by a Michael addition reaction, yielding a cured composition upon removal of the water has been prepared. The aqueous silicone emulsion comprises the product formed by mixing an organosiloxane polymer containing at least two Michael acceptor groups per organosiloxane molecule, water, a surfactant and an effective amount of a crosslinker having sufficient reactive hydrogens of a Michael donor per crosslinker molecule. The invention also describes a method for making these silicone emulsions.

21 Claims, No Drawings

SILICONE EMULSIONS WHICH CROSSLINK BY MICHAEL ADDITION REACTIONS

BACKGROUND OF THE INVENTION

1. Field of the Invention

This invention relates to an aqueous silicone emulsion which crosslinks by a Michael addition reaction, yielding a cured composition upon the removal of water and to methods of preparing such emulsions.

2. Background Information

The literature teaches that aqueous silicone emulsions are dispersions of siloxane polymers in water. Crosslinking of the siloxane polymers may take place either before evaporation of water, generally known as precured emulsions or after evaporation of the water, generally known as non-precured emulsions. Upon the evaporation of water, the silicone emulsions produce cured compositions including silicone elastomers and resins useful, for example, as coatings and sealants.

One drawback to precured emulsions is that as the siloxane polymers crosslink in the emulsion, rubber spheres of crosslinked polymer form which stick together upon the removal of water to provide a silicone elastomer. When the composition is reinforced with a filler, the filler particles surround the spheres rather than being intimately mixed throughout. Non-precured emulsions are more desirable, because these rubber spheres are not formed. Therefore, when filler is added in non-precured emulsions it can become more intimately dispersed in the silicone polymer than it is in a precured emulsion upon removal of water. In addition, it is generally known that reactive polymeric systems which cure after application to a substrate have improved adhesion relative to the less reactive precured polymeric systems.

Although more desirable than precured systems, a problem with known non-precured systems is that an external stimulus is needed in order to effect crosslinking. For example, U.S. Pat. Nos. 5,082,873 and 5,089,537 describe emulsions of silicone copolymers formed from unsaturated hydrocarbon groups and functional silicone such as organosilicon hydrides, mercaptoalkylsilanes or methacrylsilanes. When the emulsion of the copolymer produced is combined with a photoinitiator, the copolymer can be crosslinked upon exposure to ultraviolet radiation. This crosslinking can take place before or after removal of water.

In addition, EP 0 578 893 describes an aqueous emulsion of siloxane polymers containing oxidatively curing substituents such as cyclopentenyl groups and a cobalt hardening catalyst and optionally a mineral filler which cures oxidatively upon removal of water to an elastomer.

An objective of this invention is to prepare aqueous silicone emulsions which yield a cured composition upon the removal of water and do not require an external stimulus in order to effect crosslinking, Another objective of this invention is to prepare a one-part aqueous silicone emulsion which yields a cured composition upon the removal of water by utilizing functional groups that are unaffected by water and can be kept separate until the water is removed.

SUMMARY OF INVENTION

The objectives of this invention can be achieved by preparing an aqueous silicone emulsion which crosslinks by a Michael addition reaction, yielding a cured composition upon removal of water. The aqueous silicone emulsion comprises the product formed by mixing an organosiloxane polymer containing at least two acceptor groups per organosiloxane molecule, water, a surfactant and an effective amount of a crosslinker containing sufficient reactive hydrogens per crosslinker molecule or a precursor thereto.

The invention also describes a method for making these silicone emulsions.

DETAILED DESCRIPTION OF THE INVENTION

This invention relates to an aqueous silicone emulsion which crosslinks by a Michael addition reaction, yielding a cured composition upon removal of water, the silicone emulsion comprising the product formed by mixing (A) an organosiloxane polymer having the general formula

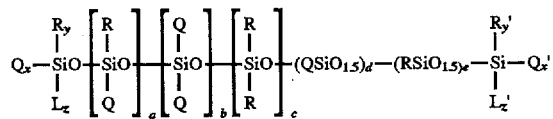

where

R is individually selected from the group consisting of hydrogen, 3,3,3-trifluoropropyl radicals and monovalent hydrocarbon radicals having from 1 to 15 carbon atoms;

L is individually selected from the group consisting of hydrogen, a hydroxyl group, and a hydrolyzable group;

Q is an acceptor group individually selected from the group consisting of $CH_2=CR^1COR^2-$, $CH_2=CR^1COOR^2-$, $CH_2=CR^1CONHR^2-$ and $CH_2=CR^1CR^1=CR^2-$, where $R^1$ is individually selected from the group consisting of hydrogen and monovalent, aliphatic hydrocarbon radicals having from 1 to 15 carbon atoms and $R^2$ is individually selected from the group consisting of divalent hydrocarbon radicals having from 2 to 15 carbon atoms;

x and x' are each positive integers from 0 to 3;
y and y' are each positive integers from 0 to 3;
z and z' are each positive integers from 0 to 3;
x+y+z=3; x'+y'+z'=3;
a is a positive integer from 0 to 10,000;
b is a positive integer from 0 to 10,000;
c is a positive integer from 0 to 20,000;
d is a positive integer from 0 to 10,000;
e is a positive integer from 0 to 10,000;
provided, a+b+c≧100 or d+e>3, and provided further, that there are at least 2 acceptor groups per organosiloxane polymer molecule;

(B) water;
(C) a surfactant; and
(D) an effective amount of a crosslinker having sufficient reactive hydrogens per crosslinker molecule or a precursor thereto, the reactive hydrogens being covalently bonded to a nitrogen or sulfur atom of a donor group individually selected from the group consisting of —SH, —NH$_2$ and —NHR$^3$, where R$^3$ is individually selected from the group consisting of monovalent hydrocarbon radicals having from 1 to 15 carbon atoms.

The term "organosiloxane polymer" as used herein comprises siloxane compositions having mixtures of various types of siloxane polymers as well as compositions having only a single type of siloxane polymer. The organosiloxane polymer can also be a homopolymer, copolymer or terpolymer. In addition, the term includes different kinds of molecules, such as long chain linear or branched molecules and short chain linear or branched molecules. Although not critical to this invention, the molecular weight of the diorganosiloxane polymer should be above 500, preferably above 10,000 and more preferably above 100,000.

The compositions included under the term "organosiloxane polymer" and used in the present invention are well known to those skilled in the art. The organosiloxane polymers useful in the present invention can be described by the molecular formula provided above.

Substituent R in the above formula is individually selected from the group consisting of hydrogen, 3,3,3-trifluoropropyl and monovalent hydrocarbon radicals having from 1 to 15 carbon atoms. Examples of hydrocarbon radicals useful in this invention include but are not limited to alkyl radicals such as methyl, ethyl, propyl, isopropyl, butyl, pentyl, isopentyl, neopentyl, hexyl, octyl, dodecyl, 3-methylheptyl, tertiary butyl, myricyl or 2,2-diethylpentyl; alkenyl radicals such as vinyl, allyl or hexenyl; alkynal radicals such as propargyl; cycloaliphatic radicals such as cyclobutyl, cyclopentyl, cyclohexyl, cycloheptyl, propylcyclohexyl, 2,4-dimethylcyclopentyl or cyclohexenyl; aromatic radicals such as phenyl, tolyl, xylyl, naphthyl or anthracyl and aralkyl radicals such as benzyl, beta-phenylethyl, beta-phenylpropyl or gamma-tolylpropyl. Substituent R is preferably hydrogen, methyl, phenyl or 3,3,3-trifluoropropyl with methyl being more preferred.

Substituent L in the above formula is individually selected from the group consisting of hydrogen, a hydroxyl group and a hydrolyzable group. Hydrolyzable groups typically include any group attached to silicon which is hydrolyzed by water at room temperature. Examples of hydrolyzable groups that can be represented by substituent L include but are not limited to hydrogen; halogen atoms such as chlorine, fluorine, bromine or iodine; groups of the formula —OT when T is any hydrocarbon or halogenated hydrocarbon group such as methyl, ethyl, iso-propyl, octadecyl, allyl, hexenyl, cyclohexyl, phenyl, benzyl, beta-phenylether, 2-chloroethyl, chlorophenyl, 3,3,3-trifluoropropyl, or bromocyclohexyl; any hydrocarbon ether radical such as 2-methoxyethyl, 2-ethoxyisopropyl, 2-butoxyisobutyl, p-methoxyphenyl or —(CH$_2$CH$_2$O)$_2$CH$_3$; any acyl radical such as acetyl, propionyl, benzoyl, cyclohexoyl, acrylyl, methacrylyl, stearyl, naphthoyl, trifluoroacetyl, chlorobenzoyl or bromopropionyl; any acyloxy group such as acetoxy, benzoyloxy, propionoxy, or cryloxy; or any amino radical such as NH$_2$, dimethylamino, diethylamino, ethylmethylamino, diphenylamino, methylphenylamino or dicyclohexylamino. L can also be any aminoxy radical of the formula —ONT$_2$ or —ONT' in which T is as defined above and T' is any divalent hydrocarbon radical both valences of which are attached to the carbon, such as hexylene, pentylene or octylene; any ketoxime radical of the formula —ON=CT$_2$ or —ON=CT' in which T and T' are defined above; ureido groups of the formula —N(T) CONT"$_2$ in which T is defined above and T" is H or any of the T radicals; carbamate groups of the formula —OOCNTT" in which T and T" are defined above; or carboxylic amide radicals of the formula —NTC=O(T") in which T and T" are defined above. L can also be the sulfate group or the sulfate ester groups of the formula —OSO$_2$(OT) where T is as defined above; the cyano group; the isocyanate group; and the phosphate or phosphate ester groups of the formula OPO(OT)$_2$ where T is as defined above.

For this invention, it is preferred that hydrolyzable groups which may react with an acceptor group or a reactive hydrogen of a donor group as defined herein, such as halogens, or groups containing halogens, amino radicals, sulfate groups, sulfate esters, isocyanate, phosphate groups and phosphate ester groups, are not used since they may reduce the number of acceptor groups or reactive hydrogens from donor groups available for crosslinking. Substituent L is more preferably a hydroxyl group.

Substituent Q is an acceptor group individually selected from the group consisting of CH$_2$=CR$^1$COR$^2$—, CH$_2$=CR$^1$COOR$^2$—, CH$_2$=CR$^1$CONHR$^2$— and CH$_2$=CR$^1$CR$^1$=CR$^2$—, where R$^1$ is individually selected from the group consisting of hydrogen and monovalent, aliphatic hydrocarbon radicals having from 1 to 15 carbon atoms and R$^2$ is individually selected from the group consisting of divalent hydrocarbon radicals having from 2 to 15 carbon atoms.

Examples of suitable monovalent aliphatic hydrocarbon radicals represented by substituent R$^1$ include but are not limited to alkyl radicals such as methyl, ethyl, propyl, isopropyl, butyl, pentyl, isopentyl, neopentyl, hexyl, octyl, dodecyl, 3-methylheptyl, tertiary butyl, myricyl and 2,2-diethylpentyl and cycloaliphatic radicals such as cyclobutyl, cyclopentyl, cyclohexyl, or cycloheptyl, propylcyclohexyl and 2,4-dimethylcyclopentyl. R$^1$ is preferably hydrogen or methyl with hydrogen being more preferred.

Examples of suitable divalent hydrocarbon radicals represented by substituent R$^2$ include but are not limited to alkyl radicals such as ethylene, propylene, isopropylene, butylene, pentylene, isopentylene, neopentylene, hexylene, octylene, dodecylene, 3-methylheptylene, tertiary butylene, myricylene or 2,2-diethylpentylene; alkenyl radicals such as vinylene, allylene or hexenylene; alkynal radicals such as propargylene; cycloaliphatic radicals such as cyclobutylene, cyclopentylene, cyclohexylene, cycloheptylene, propylcyclohexylene, 2,4-dimethylcyclopentylene or cyclohexenylene; aromatic radicals such as phenylene, tolylene, xylylene, naphthylene or anthracylene and aralkyl radicals such as benzylene, beta-phenylethylene, beta-phenylpropylene or gamma-tolylpropylene. R$^2$ is preferably a propylene radical.

The preferred acceptor group is CH$_2$=CR$^1$COOR$^2$— where R$^1$ is a methyl radical or hydrogen and R$^2$ is a propylene radical. More preferably R$^1$ is hydrogen. Although it is required to have at least two acceptor groups per organosiloxane polymer molecule, it is preferred that the amount of acceptor groups be between about 0.1 and 10 weight percent of the total weight of the organosiloxane polymer and most preferably the amount of acceptor groups should be between about 0.5 and 2 weight percent of the total weight of the organosiloxane polymer.

At the ends of the organosiloxane polymer molecule, there are Q$_x$, R$_y$ and L$_z$ groups and Q$_{x'}$, R$_{y'}$ and L$_{z'}$ groups, where x, x', y, y', z and z' can each be a positive integer from 0 to 3, so long as x+y+z=3 and x'+y'+z'=3. It is preferred that x and x' are each 0 or 1, y and y' are each 1 or 2 and z and z' are each 0 or 1. More preferably x and x' are each 1, y and y' are each 1 and z and z' are each 1.

The organosiloxane polymer can also have various repeating units such as

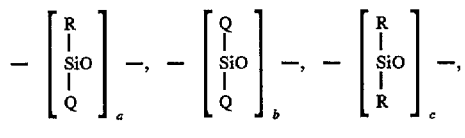

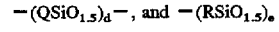

where a, b, d and e are positive integers from 0 to 10,000 and c is a positive integer from 0 to 20,000, provided, a+b+

$c \geq 100$ or $d+e > 3$. In a preferred embodiment, b, d and e are 0. In another preferred embodiment, a, b, d and e are 0 and c is at least 150.

The organosiloxane polymers are either commercially available or can be prepared by known methods, for example copolymerization of a silicone oligomer with a silane functionalized with at least one acceptor group, such as $H_2C=CHCOO(CH_2)_3SiMe(OMe)_2$, where Me refers to methyl. A preferred method for preparing the organosiloxane polymer is to first prepare a silanol endblocked siloxane polymer by conventional methods followed by condensation of the silanol groups with a silane functionalized with at least one acceptor group, such as $H_2C=CHCOO(CH_2)_3SiMe(OMe)_2$ or $H_2C=CHCOO(CH_2)_3SiMe_2(OMe)$, where Me refers to methyl, in the presence of a tin catalyst such as stannous octoate or dibutyltindilaurate. This process can be conveniently performed in emulsion by adding the silane and tin catalyst to the emulsion containing the silanol endblocked siloxane polymer. A more thorough description of this method is provided in Liles, et al. U.S. Pat. No. 5,449,717 and Liles, et al., Ser. No. 08/330,891 "Functional Polyorganosiloxane Emulsions from Monohydrolyzable Silanes and Photocurable Compositions Therefrom", both of which are hereby incorporated by reference.

The silicone emulsion is in the form of an oil-in-water emulsion. Water comprises the continuous phase of the silicone emulsion and is usually present in the amount of 15 to 70 percent by weight of the organosiloxane polymer. Preferably, the water is present in the amount of from 30 to 50 percent by weight of the organosiloxane polymer.

The term "surfactant" is meant to describe a surface active agent selected from cationic surfactants, anionic surfactants, amphoteric surfactants, nonionic surfactants and mixtures thereof which stabilizes the dispersed phase of the emulsion. Each of these types of surfactants which are known in the art as being useful in stabilizing emulsions of organosiloxane polymers, whether individually or combined with another type of surfactant, is also useful as a surfactant in the instant invention.

Suitable cationic surfactants include, but are not limited to, aliphatic fatty amines and their derivatives such as dodecylamine acetate, octadecylamine acetate and acetates of the amines of tallow fatty acids; homologues of aromatic amines having fatty chains such as dodecylanalin; fatty amides derived from aliphatic diamines such as undecylimidazoline; fatty amides derived from disubstituted amines such as oleylaminodiethylamine; derivatives of ethylene diamine; quaternary ammonium compounds such as tallow trimethyl ammonium chloride, dioctadecyldimethyl ammonium chloride, didodecyldimethyl ammonium chloride and dihexadecyldimethyl ammonium chloride; amide derivatives of amino alcohols such as beta-hydroxyethylsteraryl amide; amine salts of long chain fatty acids; quaternary ammonium bases derived from fatty amides of di-substituted diamines such as oleylbenzylamino-ethylene diethylamine hydrochloride; quaternary ammonium bases of the benzimidazolines such as methylheptadecyl benzimidazole hydrobromide; basic compounds of pyridinium and its derivatives such as cetylpyridinium chloride; sulfonium compounds such as octadecylsulfonium methyl sulfate; quaternary ammonium compounds of betaine such as betaine compounds of diethylamino acetic acid and octadecylchloromethyl ether; urethanes of ethylene diamine such as the condensation products of stearic acid and diethylene triamine; polyethylene diamines; and polypropanolpolyethanol amines.

Suitable anionic surfactants include, but are not limited to sulfonic acids and their salt derivatives such as described in U.S. Pat No. 3,294,725 to Findley et al., which patent is hereby incorporated by reference. These anionic surfactants can be exemplified by, but are not limited to, alkali metal sulforicinates; sulfonated glycerol esters of fatty acids such as sulfonated monoglycerides of coconut oil acids; salts of sulfonated monovalent alcohol esters such as sodium oleylisethionate; amides of amino sulfonic acids such as the sodium salt of oleyl methyl tauride; sulfonated products of fatty acids nitriles such as palmitonitrile sulfonate; sulfonated aromatic hydrocarbons such as sodium alpha-naphthalene monosulfonate and dibutyldodecylbenzenesulfonate (DBSA); condensation products of naphthalene sulfonic acids with formaldehyde; sodium octahydroanthracene sulfonate; alkali metal alkyl sulfates, such as sodium lauryl sulfate; ether sulfates having alkyl groups of 8 or more carbon atoms, and alkylarylsulfonates having 1 or more alkyl groups of 8 or more carbon atoms.

Suitable amphoteric surfactants include, but are not limited to, lecithin, glycinates, betaines, sultaines and alkyl aminopropionates. These can be exemplified by cocoamphglycinate, coco-amphocarboxy-glycinates, cocoamidopropylbetaine, lauryl betaine, cocoamidopropylhydroxy-sultaine, laurylsulataine, and cocoamphodipropionate.

Useful nonionic surfactants may be exemplified, but not limited to, polyoxyalkylene alkyl ethers, polyoxyalkylene sorbitan esters, polyoxyalkylene esters, polyoxyalkylene alkylphenyl ethers, ethoxylated amides, ethoxylated siloxanes, block copolymers of propylene oxide and ethylene oxide and others.

Anionic surfactants are the preferred surfactants with sodium lauryl sulfate and sodium dodecylbenzene sulfonate being more preferred.

Generally, the amount of surfactant used should be that amount which stabilizes the dispersed phase of the silicone emulsion. An amount of about 2 to 5 weight percent based on the weight of the organosiloxane polymer should be sufficient with 2 weight percent based on the weight of the organosiloxane polymer being preferred. Excess surfactant can detract from the properties of the cured compound such as mechanical properties and moisture sensitivity.

The organosiloxane polymer in the silicone emulsion of this invention is crosslinked using an effective amount of a crosslinker comprising donor groups having sufficient reactive hydrogens per crosslinker molecule or a precursor thereto. For crosslinking to occur in this invention, the reactive hydrogens are covalently bonded to a nitrogen atom or a sulfur atom of a donor group selected from the group consisting of —SH, —NH$_2$, and —NHR$^3$, where R$^3$ is individually selected from the group consisting of monovalent hydrocarbon radicals having from 1 to 15 carbon atoms.

A sufficient amount of reactive hydrogens is that amount which enables the crosslinker and organosiloxane polymers to form a crosslinked network. Generally, a sufficient amount of reactive hydrogens would be at least 2 or 3 reactive hydrogens per crosslinker molecule depending on the number of acceptor groups on each organosiloxane polymer molecule. If the organosiloxane polymer has 2 acceptor groups per molecule, for crosslinking to occur, the crosslinker must have at least 3 reactive hydrogens per crosslinker molecule. If the organosiloxane polymer has at least 3 acceptor groups per polymer molecule, for crosslinking to occur, the crosslinker only needs at least 2 reactive hydrogens per crosslinker molecule. Preferably, there are at least 3 reactive hydrogens per crosslinker molecule.

The precursor to a compound having sufficient reactive hydrogens can be any compound which is capable of forming in situ a compound containing sufficient reactive hydrogens. For example, $(MeO)_3Si(CH_2)_3SH$ only has 1 reactive hydrogen per molecule as defined herein. However, the methoxy groups on 1 molecule of $(MeO)_3Si(CH_2)_3SH$ can hydrolyze to form hydroxy groups and condense with hydroxy groups from other such hydrolyzed molecules, thereby providing a crosslinker molecule having multiple —SH groups and thus at least 2 or 3 reactive hydrogens.

The term "reactive hydrogen" as used herein describes each hydrogen which is covalently bonded to a nitrogen atom or sulfur atom of a donor group selected from the group described above. These reactive hydrogens are capable of reacting with acceptor groups on the organosiloxane polymer by a Michael addition.

The term "donor group" as used herein describes a mercapto group —SH having 1 reactive hydrogen; a primary amino group —$NH_2$ having 2 reactive hydrogens; and a secondary amino group —$NHR^3$ having 1 reactive hydrogen, where $R^3$ is individually selected from the group consisting of monovalent hydrocarbon radicals having from 1 to 15 carbon atoms.

The monovalent hydrocarbon radicals of substituent $R^3$ of the donor group —$NHR^3$, include alkyl radicals such as methyl, ethyl, propyl, isopropyl, butyl, pentyl, isopentyl, neopentyl, hexyl, octyl, dodecyl, 3-methylheptyl, tertiary butyl, myricyl or 2,2-diethylpentyl; alkenyl radicals such as vinyl, allyl or hexenyl; alkynal radicals such as propargyl; cycloaliphatic radicals such as cyclobutyl, cyclopentyl, cyclohexyl, cycloheptyl, propylcyctohexyl, dimethylcyclopentyl or cyclohexenyl; aromatic radicals such as phenyl, tolyl, xylyl, naphthyl or anthracyl and aralkyl radicals such as benzyl, beta-phenylethyl, beta-phenylpropyl or gamma-tolylpropyl. Substituent $R^3$ of the donor group $NHR^3$ is preferably methyl.

Examples of crosslinkers include but are not limited to aminofunctional silanes and siloxanes such as $(MeO)_3Si(CH_2)_3NH(CH_2)_2NH_2$, $(EtO)_3Si(CH_2)_3NH_2$ and $H_2N(CH_2)_3(EtO)SiMe(OSiMe_2)_{0.95}(H_2N(CH_2)_3SiMeO)_{0.05}SiMe(OEt)(CH_2)_3NH_2$, a silicone fluid having a viscosity of about 1500 cs and a molar ratio of $(OSiMe_2)$ to $(H_2N(CH_2)_3SiMeO)$ of 0.95 to 0.05; mercaptofunctional silanes and siloxanes such as $(EtO)_2SiMe(CH_2)_3SH$ and $(MeO)_3Si(CH_2)_3SH$; in each case where Me and Et are methyl and ethyl, and siliconates having the formula $(M^+O^-)_mSi(OH)_{3-m}R'$ or $(M^+O^-)_nSi(OH)_{2-n}R'R''$, where M is individually selected from alkali metal cations, a phosphonium group or an ammonium group, R' is individually selected from the group consisting of divalent hydrocarbon radicals having from 3 to 8 carbon atoms, 1 valence attached to the silicon atom and 1 valence attached to a $NH_2$ or $NHR^3$ group where $R^3$ is as defined above, R" is a monovalent hydrocarbon radical having 1 to 8 carbon atoms, m is a whole or fractional number from 0.1 to 3 and n is a whole or fractional number from 0.1 to 2.

Substituent M can be represented by the alkali metal cations lithium ($Li^+$), sodium ($Na^+$), potassium ($K^+$), cesium ($Cs^+$), rubidium ($Rb^+$) and the radicals $NR''_4{}^+$ and $PR''_4{}^+$ where R" is as defined above. Examples of substituent R" include but are not limited to alkyl radicals such as methyl, ethyl, propyl, isopropyl, butyl, pentyl, isopentyl, neopentyl, hexyl, octyl, 3-methylheptyl, tertiary butyl, or 2,2-diethylpentyl; alkenyl radicals such as vinyl, allyl or hexenyl; alkynal radicals such as propargyl; cycloaliphatic radicals such as cyclobutyl, cyclopentyl, cyclohexyl or cycloheptyl, or cyclohexenyl; aromatic radicals such as phenyl or tolyl and aralkyl radicals such as benzyl and beta-phenylethyl. R" is preferably methyl.

Preferred M substituents are $Na^+$ and $K^+$.

Examples of suitable divalent hydrocarbon radicals represented by substituent R' are the same as described above for $R^2$ except for the examples containing two carbon atoms and greater than 8 carbon atoms. R' is preferably an aminopropylene group.

Preferably, m and n are each 0.5 to 1.

Examples of siliconates include but are not limited to $NaOSi(OH)_2(CH_2)_3NH_2$, $NaO(OH)Si(CH_3)(CH_2)_3NH_2$, $KO_{0.5}(HO)_{1.5}Si(CH_3)(CH_2)_3NH_2$, $KOSi(OH)_2(CH_2)_3NH_2$, $LiO(OH)Si(CH_3)(CH_2)_3NH_2$, and $KO(HO)Si(CH_3)(CH_2)_3NH_2$.

Additional examples of crosslinkers include but are not limited to multifunctional amino or mercapto compounds such as $H_2NCH_2CH_2NHCH_2CH_2NH_2$, $H_2NCHCH_3CH_2(OCH_2CHCH_3)_3NH_2$, $CH_3CH_2C(CH_2OCH_2CHCH_3NH_2)_3$, 1,2-ethanedithiol, 1,6-hexanedithiol and trithiocyanuric acid.

The preferred crosslinkers are siliconates having the formula $(M^+O^-)_nSi(OH)_{2-n}R'R''$ where M is $Na^+$ or $K^+$, R' is an aminopropylene group, R" is methyl and n is 0.5 to 1, $(CH_3O)_2SiCH_3(CH_2)_3SH$ and $H_2NCHCH_3CH_2(OCH_2CHCH_3)_3NH_2$. More preferred crosslinkers are $NaO(OH)Si(CH_3)(CH_2)_3NH_2$ and $KO_{0.5}(HO)_{1.5}Si(CH_3)(CH_2)_3NH_2$.

An effective amount of crosslinker is that amount which provides the needed number of reactive hydrogens for reacting with the acceptor groups of the organosiloxane polymer to yield a cured composition upon the removal of water. Since the crosslinking occurs by a Michael addition reaction of reactive hydrogens to the acceptor groups of the organosiloxane polymer, what constitutes an effective amount of crosslinker depends on the amount of reactive hydrogens on each crosslinker molecule and the amount of acceptor groups on the organosiloxane polymer.

Generally, the crosslinker should be added in an amount which provides at least a stoichiometric equivalent of reactive hydrogens relative to the acceptor groups on the organosiloxane polymer. As used herein, "stoichiometric equivalent" means the number of reactive hydrogens is the same as the number of acceptor groups. Preferably, enough crosslinker should be added such that there is a stoichiometric excess of reactive hydrogens relative to the acceptor groups on the organosiloxane polymer. Having a stoichiometric excess will assure that crosslinking proceeds at a practical rate. By "stoichiometric excess" it is meant that the number of reactive hydrogens provided by the crosslinker is greater than the number of acceptor groups on the organosiloxane polymer. Most preferably, enough crosslinker should be added such that there is about a 2 to 10 fold stoichiometric excess of reactive hydrogens relative to the acceptor groups on the organosiloxane polymer.

The crosslinker can be added neat, in solution or as a second dispersed phase separate from the dispersed phase containing the organosiloxane polymer which has been emulsified by conventional methods. The crosslinker may also be added at any time during the compounding process. It is preferred to add the crosslinker neat or in solution to the water phase after the organosiloxane polymer has been emulsified. The time of addition of the crosslinker and whether added neat, in solution or as a second dispersed phase separate from the dispersed phase containing the organosiloxane polymer, may affect when crosslinking of the organosiloxane polymer occurs.

The crosslinker may be added as a single species or as a mixture of two or more different species. The crosslinkers are commercially available or can be made by known methods.

It may be useful to add a filler and other ingredients to the silicone emulsion depending on the properties desired and the specific use for the cured composition. Examples of filler are silica, calcium carbonate and kaolin clay. Other ingredients include pigments, thickeners, theology modifiers and preservatives. The order of addition of these ingredients is not critical, but usually these additives are incorporated in the silicone emulsion after the organosiloxane polymer and crosslinker have been added.

The particle size of the silicone emulsion does not limit the scope of the present invention as the Michael addition reactions occur without regard to particle size. However, particle size should be such that the silicone emulsion remains stable for a useful length of time, which is usually on the order of several years. Particle sizes of 200 to 1000 nm typically provide this degree of emulsion stability.

Aqueous silicone emulsions which can be used in this invention may be prepared by many different methods well known in the art. One useful method is emulsion polymerization which is taught in U.S. Pat. Nos. 2,891,920, 3,294,725, 3,355,406, 3,360,491, 3,697,469, 5,449,717 and Liles, et al., Ser. No. 08/330,891 "Functional Polyorganosiloxane Emulsions from Monohydrolyzable Silanes and Photocurable Compositions Therefrom", all of which are incorporated herein by reference.

With emulsion polymerization, cyclic or linear siloxane oligomers are dispersed in water with at least one surfactant to form a premixture. Typically, amphoteric, anionic or cationic surfactants are used or mixtures of amphoteric, cationic or anionic surfactants with nonionic surfactants are also acceptable. The premixture is then subjected to high shear, using either conventional mixing equipment or high shear equipment such as a homogenizer, to form an emulsion which comprises an aqueous phase and a dispersed phase of siloxane oligomers. To adjust pH, an acid or base may be added to the emulsion or it is added to the premixture. Although the polymerization will proceed satisfactorily at room temperature, it can be run at elevated temperatures as well, a preferred range being 25° C. to 80° C. The time of polymerization will generally take from 1 to 24 hours depending on the temperature and the desired molecular weight of the polymer. After the desired molecular weight is reached, polymerization is terminated by neutralizing the emulsion.

Using emulsion polymerization, the organosiloxane polymers can be formed in one step by copolymerizing siloxane oligomers with silanes or other siloxane compounds containing at least 1 acceptor group. Alternatively, the organosiloxane polymers can be prepared in two steps by first forming a silanol endblocked siloxane polymer and then condensing the silanol groups with a silane or other siloxane compound containing at least 1 acceptor group, in the presence of a tin catalyst. The crosslinker is then added neat or in solution to the continuous water phase or as a second dispersed phase separate from the dispersed phase containing the organosiloxane polymer.

Another method for preparing the aqueous silicone emulsion is by direct emulsification of siloxane polymers, including organosiloxane polymers, which have been preformed outside of emulsion. This direct emulsification method is also well known to those skilled in the art and taught for example in U.S. Pat. Nos. 4,177,177 and 5,449,717 and in Liles, et al., Ser. No. 08/330,891 "Functional Polyorganosiloxane Emulsions from Monohydrolyzable Silanes and Photocurable Compositions Therefrom", all of which are incorporated herein by reference.

With direct emulsification, a mixture of preformed siloxane polymer, surfactant and water is emulsified at a temperature on the order of 10° C. to 70° C. by mixing with sufficient shear for a sufficient period of time. Typically, amphoteric, anionic, cationic or non-ionic surfactants are used singly or as mixtures. The mixing can take place in any type of commercial mixing equipment or a homogenizer.

If preformed siloxane polymers not including acceptor groups are used however, an additional step is needed to form the organosiloxane polymer. For example, if a preformed silanol endblocked siloxane polymer is emulsified as described above, the silanol groups must be condensed with a silane or other siloxane compound containing at least 1 acceptor group, in the presence of a tin catalyst to form the organosiloxane polymer.

Emulsifying water, a surfactant, an organosiloxane polymer and a crosslinker at the same time forms one embodiment of the invention. In this embodiment, crosslinking will likely begin immediately, forming a silicone emulsion comprising a dispersed phase comprising a crosslinked product of the organosiloxane polymer and crosslinker. If the crosslinker is added to the continuous water phase or as a second dispersed phase separate from the dispersed phase containing the organosiloxane polymer, after emulsification of the organosiloxane polymer with water and surfactant, the dispersed phase comprises the organosiloxane polymer and crosslinking may not occur until the water in the silicone emulsion is removed.

In a preferred method of forming the silicone emulsion, the crosslinker is added neat or in solution to the continuous water phase of the emulsified organosiloxane polymer or as a second dispersed phase separate from the dispersed phase containing the organosiloxane polymer.

In a more preferred method of forming the silicone emulsion, the organosiloxane polymer is formed in emulsion and then a crosslinker is added neat or in solution to the continuous water phase or as a second dispersed phase separate from the dispersed phase containing the organosiloxane polymer.

Removing the water from the silicone emulsion yields a cured composition. The water may be removed by evaporation or other conventional methods. The water will evaporate at ambient temperatures, however, elevated temperatures may also be used to remove the water at a faster rate. The cured composition can find use as a coating material or as a sealant.

An aqueous silicone emulsion which yields a cured composition upon the removal of water and does not require an external stimulus in order to effect crosslinking has been prepared. This preparation was achieved by utilizing groups that are unaffected by water and can be kept separate even in a one-part system until the water is removed.

EXAMPLES

The following examples are presented for illustrative purposes and should not be construed as limiting the present invention which is delineated in the claims.

(A) Preparation of $NaO(OH)SiCH_3(CH_2)_3NH_2$ Crosslinker

An aqueous solution of sodium 3-aminopropylmethylsiliconate was prepared by adding dropwise with stirring, 15 g of 3-aminopropylmethyldiethoxysilane to a solution of sodium hydroxide in water that was prepared by adding 42 g of 2N sodium hydroxide to 43 g of deionized (DI) water. This solution corresponded to an approximately 15 percent solids solution of the sodium siliconate: $NaO(OH)SiCH_3(CH_2)_3NH_2$.

(B) Preparation of $KO_{0.5}(HO)_{1.5}SiCH_3(CH_2)_3NH_2$ Crosslinker

An aqueous solution of potassium 3-aminopropylmethylsiliconate was prepared by adding dropwise with stirring over a one hour period, 50 g of $(EtO)_2SiCH_3Me(CH_2)_3NH_2$, where Et is ethyl, to an aqueous solution of 7.3 g of KOH in 325 g of deionized water. After all of the silane had been added, the solution was heated at 50° C. at 5 mm Hg vacuum for 20 minutes using a rotary evaporator in order to remove ethanol. This solution had a non-volatile content of 12.8 percent by weight and it corresponded to a composition having the following empirical formula: $K_{0.5}(HO)_{1.5}SiCH_3(CH_2)_3NH_2$.

Example 1

(a) 200 g of an aqueous emulsion of silanol terminated PDMS having a solids content of about 62 percent by weight, the emulsion particles being less than 400 nm in average diameter and the polymer having a weight average molecular weight of approximately 240,000, and the emulsion having a pH of 10.2 was weighed into a 500 ml jar equipped with a stirrer. 0.6 g of stannous octoate was added to the emulsion and the mixture was stirred for 3 min. Next 1.2 g of $(CH_3O)_2SiCH_3(CH_2)_3OCOCH=CH_2$, 3-acryloxypropylmethyldimethoxysilane, was added dropwise to the emulsion with stirring. The mixture was stirred for an additional 5 min after addition of all of the silane endcapper. The jar was capped and the emulsion was allowed to remain undisturbed for 24 hrs. The pH of the emulsion was then adjusted to between 9–10 by the dropwise addition with stirring of 14 percent aqueous ammonia. This composition consisted of an approximately 60–62 percent solids emulsion of polydimethylsiloxane (PDMS) containing 0.5 part per hundred (pph) stannous octoate and 1 pph 3-acryloxypropylmethyldimethoxysilane, both based on siloxane polymer weight. A film cast from this emulsion (by removal of water) produced a sticky, gummy siloxane polymer that was soluble in heptane.

(b) 100 g of the silicone emulsion prepared in Example 1(a) above was weighed into a 500 ml jar equipped with a stirrer. 4 g of the sodium siliconate solution prepared as described in (A) was added to the emulsion with stirring. A visual inspection of the emulsion revealed that no gels or coagulum had formed after addition of the sodium siliconate. Films of the emulsion were cast by pouring 8 g of emulsion into 100 mm diameter polystyrene Petri dishes and allowing them to stand uncovered and undisturbed for 4 days. The films were elastomeric. Swelling properties of the elastomeric films were determined by swelling them in heptane, see Table I. Mechanical properties of the elastomeric film were also determined as provided in Table I.

Example 2

(a) 620 g of hydroxyl end-blocked PDMS fluid having a viscosity of about 0.08 Pa s and 6.2 g of 3-acryloxypropylmethyldimethoxysilane, $(CH_3O)_2SiCH_3(CH_2)_3O_2CCH=CH_2$, were mixed together for 5 min to form a solution. 62 g of a 10% solution of sodium lauryl sulfate was added to the silicone oil followed by 313.4 g of water and this mixture was stirred moderately for 45 min. The resulting dispersion was homogenized by passing it through a Microfluidics microfluidizer for two passes at 51.7 MPa (7500 psi). 4.6 g of dodecylbenzene sulfonic acid (DBSA) was added to the resulting emulsion and the mixture was shaken for several minutes, after which it was allowed to remain undisturbed for 24 hrs. The emulsion was neutralized to pH 7–8 with stirring using 14% ammonium hydroxide. This composition consisted of an approximately 60–62% solids emulsion of a PDMS/3-acryloxypropylmethylsiloxane copolymer having approximately 1 percent acryl functionality, based on polymer weight. Evaporation of water from a film of this emulsion produced a tacky, gummy polymer that was soluble in heptane.

(b) To 100 g of the acryl functional PDMS emulsion prepared in Example 2(a) was added with stirring, 5 g of the sodium 3-aminopropylmethylsiliconate solution prepared in (A) above. Films were cast from this mixture and they were allowed to dry for 2 days. The resulting films were elastomeric and insoluble in heptane.

Example 3

(a) 100 g —OH endblocked PDMS polymer having a viscosity of 50 pa s at 25 C. and a weight average molecular weight of about 110,000 was weighed into a WIPMIX® container (vacuum equipped laboratory mixer, Whip Mix Corp.) equipped with a stirrer and vacuum followed by 4 g of a 50 percent solution of TERGITOL® TMN-6, a nonionic surfactant, (ethoxylated trimethylnonanol HLB=11.7, Union Carbide) in water. The cover was closed and the contents of the container was mixed under vacuum for three one-half minute intervals. Between each mixing interval, vacuum was broken, the cover removed and the walls of the container were scraped down with a spatula. After the third mixing period, 21 g of water was added and the contents were again mixed under vacuum for 30 sec to complete the formation of an emulsion. This composition consisted of an 80% solids, aqueous, oil-in-water emulsion of hydroxyl end-blocked PDMS.

To the above emulsion was added 1.0 g of stannous octoate and the emulsion was stirred under vacuum for 30 sec. Next 2 g of 3-acryloxypropylmethyldimethoxysilane was added to the emulsion in two equal portions followed by 30 sec of stirring under vacuum after each addition. The emulsion was allowed to remain undisturbed for 24 hours after which pH of the emulsion was raised to 7–8 by the dropwise addition of 14% aqueous ammonia with stirring. This emulsion consisted of an approximately 80% solids emulsion of PDMS containing 1 pph stannous octoate and 2 pph 3-acryloxypropylmethyldimethoxysilane. A portion of this emulsion was spread into a film and allowed to dry at room temperature. Four days later it was inspected and found to be a tacky, gummy polymer that was soluble in heptane.

(b) To 20 g of the acryloxy functional emulsion formed in Example 3(a) above was added with stirring 2 g of the sodium 3-aminopropylmethylsiliconate solution prepared as described in (A) above. A portion of this emulsion was spread into an approximately 4 mm thick film and allowed to dry at room temperature for 4 days. The film was elastomeric and insoluble in heptane.

Example 4

(a) 200 g of an aqueous emulsion of silanol terminated PDMS having a solids content of about 62 percent by weight, the emulsion particles being less than 400 nm in average diameter and the polymer having a weight average molecular weight of approximately 240,000, and the emulsion having a pH of 10.2 was weighed into a glass jar equipped with a stirrer. 0.6 g of a 50 percent active, aqueous, anionic emulsion of dioctyltindioctoate, prepared by emulsifying a mixture of the tin compound, water and a sufficient amount of an anionic surfactant, such as sodium alkylaryl polyether sulfonate, was added to the emulsion with stirring followed by the dropwise addition of 1.2 g of $(CH_3O)_2SiCH_3(CH_2)_3OCOCH=CH_2$, also with stirring. Stirring was continued for five minutes after all of the acryl functional silane had been added. Removal of water from a portion of this emulsion 24 hours later resulted in a sticky, gummy polymer that was soluble in heptane. This composition consisted of an aqueous emulsion of PDMS containing 0.25 parts dioctyltindioctoate and 1.0 part $(CH_3O)_2SiCH_3(CH_2)_3OCOCH=CH_2$, both based on polymer weight.

(b) To 10 g of the acryl functional siloxane emulsion prepared in Example 4(a) above placed in a 100 mm diameter Petri dish was added 0.6 g of the potassium 3-aminopropylmethylsiliconate solution prepared as described in (B) above. The mixture was stirred for several minutes, after which it was allowed to dry at ambient conditions for 14 days. The resulting film was inspected and found to be elastomeric and it was insoluble in heptane. Swelling properties in heptane were determined and tensile properties were also measured. These properties are given in Table I.

(c) To 5 g of the acryl functional siloxane emulsion prepared in Example 4(a) above placed in a 100 mm diameter Petri dish was added 0.5 g of the polyoxyalkyleneamine, $H_2NCHCH_3CH_2(OCH_2CHCH_3)_3NH_2$, (JEFFAMINE®D-230). The mixture was stirred for several minutes until it was homogeneous, after which it was allowed to dry at ambient conditions for 14 days. The resulting film was elastomeric and insoluble in heptane. Swelling properties in heptane were determined and they are given in Table I. Tensile properties were also determined and they are given in Table I.

Example 5

To 6 g of the acryl functional siloxane emulsion described in Example 4(a) placed in a 100 mm diameter plastic Petri dish was added 0.2 g of $(CH_3O)_2SiCH_3(CH_2)_3SH$. The contents of the dish were mixed with a spatula until it became homogeneous. The open dish was allowed to remain undisturbed for 14 days after which the resulting film was inspected. The film was elastomeric and insoluble in heptane. Swelling properties in heptane were determined and they are given in Table I. Tensile properties were also measured for the film and they are given in Table I.

TABLE I

| Example | Crosslinker | % Swell | % Gel | Tensile, psi(MPa) | % Elong | 100% Modulus psi (MPa) |
|---|---|---|---|---|---|---|
| 1(b) | A | 2,177 | 68.2 | 41 (0.28) | 876 | 7 (0.05) |
| 4(b) | B | 1068 | 87.7 | 138 (0.95) | 467 | 39 (0.27) |
| 4(c) | C | 3373 | 58.6 | 88 (0.61) | 1060 | 16 (0.11) |
| 5 | D | 1638 | 64.6 | 38 (0.26) | 864 | 7 (0.05) |

A = $NaO(OH)SiCH_3(CH_2)_3NH_2$
B = $KO_{0.5}(HO)_{1.5}SiCH_3(CH_2)_3NH_2$
C = $H_2NCHCH_3CH_2(OCH_2CHCH_3)_3NH_2$
D = $(CH_3O)_2SiCH_3(CH_2)_2SH$

We claim:

1. An aqueous silicone emulsion which crosslinks by a Michael addition reaction, yielding a cured composition upon removal of water, the silicone emulsion comprising the product formed by mixing (A) an organosiloxane polymer having the general formula $$Q_x-\underset{\underset{L_z}{|}}{\overset{\overset{R_y}{|}}{Si}}O\left[\underset{\underset{Q}{|}}{\overset{\overset{R}{|}}{Si}}O\right]_a\left[\underset{\underset{Q}{|}}{\overset{\overset{Q}{|}}{Si}}O\right]_b\left[\underset{\underset{R}{|}}{\overset{\overset{R}{|}}{Si}}O\right]_c-(QSiO_{1.5})_d-(RSiO_{1.5})_e-\underset{\underset{L_{z'}}{|}}{\overset{\overset{R_{y'}}{|}}{Si}}-Q_{x'}$$

where

R is individually selected from the group consisting of hydrogen, 3,3,3-trifluoropropyl radicals and monovalent hydrocarbon radicals having from 1 to 15 carbon atoms;

L is individually selected from the group consisting of hydrogen, a hydroxyl group, and a hydrolyzable group;

Q is an acceptor group individually selected from the group consisting of $CH_2=CR^1COR^2—$, $CH_2=CR^1COOR^2—$, $CH_2=CR^1CONHR^2—$ and $CH_2=CR^1CR^1=CR^2—$, where $R^1$ is individually selected from the group consisting of hydrogen and monovalent, aliphatic hydrocarbon radicals having from 1 to 15 carbon atoms and $R^2$ is individually selected from the group consisting of divalent hydrocarbon radicals having from 2 to 15 carbon atoms;

x and x' are each positive integers from 0 to 3;

y and y' are each positive integers from 0 to 3;

z and z' are each positive integers from 0 to 3;

x+y+z=3; x'+y'+z'=3;

a is a positive integer from 0 to 10,000;

b is a positive integer from 0 to 10,000;

c is a positive integer from 0 to 20,000;

d is a positive integer from 0 to 10,000;

e is a positive integer from 0 to 10,000;

provided, a+b+c≧100 or d+e>3, and provided further, that there are at least 2 acceptor groups per organosiloxane polymer molecule;

(B) water;

(C) a surfactant; and (D) an effective amount of a crosslinker having sufficient reactive hydrogens per crosslinker molecule or a precursor thereto, the reactive hydrogens being covalently bonded to a nitrogen or sulfur atom of a donor group individually selected from the group consisting of —SH, —NH$_2$ and —NHR$^3$, where R$^3$ is individually selected from the group consisting of monovalent hydrocarbon radicals having from 1 to 15 carbon atoms.

2. The silicone emulsion of claim 1 and further comprising a filler.

3. The silicone emulsion of claim 1, wherein the effective amount of crosslinker is an amount providing at least a stoichiometric equivalent of reactive hydrogens relative to the acceptor groups on the organosiloxane polymer.

4. The silicone emulsion of claim 3, wherein R is a methyl radical; L is a hydroxyl group; Q is $CH_2=CR^1COOR^2$— where $R^1$ is hydrogen and $R^2$ is a propylene radical; x and x' are each 0 or 1; y and y' are each 1 or 2; z and z' are each 0 or 1; b, d and e are 0; the crosslinker is selected from the group consisting of siliconates having the formula $(M^+O^-)_mSi(OH)_{3-m}R'$ or $(M^+O^-)_nSi(OH)_{2-n}R'R''$, where M is individually selected from alkali metal cations, a phosphonium group or an ammonium group, R' is individually selected from the group consisting of divalent hydrocarbon radicals having from 3 to 8 carbon atoms 1 valence attached to the silicon atom and 1 valence attached to a NH$_2$ or NHR$^3$ group, where R$^3$ is as defined above, R" is a monovalent hydrocarbon radical having 1 to 8 carbon atoms, m is a whole or fractional number from 0.1 to 3 and n is a whole or fractional number from 0.1 to 2, $(CH_3O)_2SiCH_3(CH_2)_3SH$ and $H_2NCHCH_3CH_2(OCH_2CHCH_3)_3NH_2$; acceptor groups comprise 0.1 to 10 percent by weight of the organosiloxane polymer and the effective amount of crosslinker is an amount providing a stoichiometric excess of reactive hydrogens relative to the acceptor groups on the organosiloxane polymer.

5. The silicone emulsion of claim 4, wherein the crosslinker is a siliconate having the formula $(M^+O^-)_nSi(OH)_{2-n}R'R''$, where M is $Na^+$ or $K^+$, R' is an aminopropylene group; R'' is a methyl radical and n is from 0.5 to 1.

6. The silicone emulsion of claim 5, wherein x and x' are each 1; y and y' are each 1; z and z' are each 1; a=0; c is at least 150; there are at least 3 reactive hydrogens per crosslinker molecule; the crosslinker is $NaO(OH)SiCH_3(CH_2)_3NH_2$ or $KO_{0.5}(HO)_{1.5}SiCH_3(CH_2)_3NH_2$; acceptor groups comprise 0.5 to 2 percent by weight of the organosiloxane polymer and the effective amount of crosslinker is an amount providing about a 2 to 20 fold stoichiometric excess of reactive hydrogens relative to the acceptor groups on the organosiloxane polymer.

7. The aqueous silicone emulsion of claim 6 and further comprising a filler.

8. An aqueous silicone emulsion which crosslinks by a Michael addition reaction, yielding a cured composition upon removal of water, comprising:

(A) a dispersed phase comprising an organosiloxane polymer having the general formula

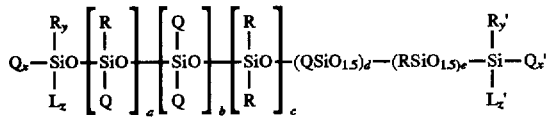

where

R is individually selected from the group consisting of hydrogen, 3,3,3-trifluoropropyl radicals and monovalent hydrocarbon radicals having from 1 to 15 carbon atoms;

L is individually selected from the group consisting of hydrogen, a hydroxyl group, and a hydrolyzable group;

Q is an acceptor group individually selected from the group consisting of $CH_2=CR^1COR^2—$, $CH_2=CR^1COOR^2—$, $CH_2=CR^1CONHR^2—$ and $CH_2=CR^1CR^1=CR^2—$, where $R^1$ is individually selected from the group consisting of hydrogen and monovalent, aliphatic hydrocarbon radicals having from 1 to 15 carbon atoms and $R^2$ is individually selected from the group consisting of divalent hydrocarbon radicals having from 2 to 15 carbon atoms;

x and x' are each positive integers from 0 to 3;

y and y' are each positive integers from 0 to 3;

z and z' are each positive integers from 0 to 3;

x+y+z=3; x'+y'+z'=3;

a is a positive integer from 0 to 10,000;

b is a positive integer from 0 to 10,000;

c is a positive integer from 0 to 20,000;

d is a positive integer from 0 to 10,000;

e is a positive integer from 0 to 10,000;

provided, a+b+c≧100 or d+e>3, and provided further, that there are at least 2 acceptor groups per organosiloxane polymer molecule;

(B) a continuous water phase;

(C) a surfactant; and (D) an effective amount of a crosslinker having sufficient reactive hydrogens per crosslinker molecule or a precursor thereto, the reactive hydrogens being covalently bonded to a nitrogen or sulfur atom of a donor group individually selected from the group consisting of —SH, —$NH_2$ and —$NHR^3$, where $R^3$ is individually selected from the group consisting of monovalent hydrocarbon radicals having from 1 to 15 carbon atoms, the crosslinker being present in the continuous water phase or as a second dispersed phase separate from the dispersed phase containing the organosiloxane polymer, yielding a cured composition upon the removal of water.

9. The silicone emulsion of claim 8 and further comprising a filler.

10. The silicone emulsion of claim 8, wherein the crosslinker is present in the continuous water phase and the effective amount of crosslinker is an amount providing at least a stoichiometric equivalent of reactive hydrogens relative to the acceptor groups on the organosiloxane polymer.

11. The silicone emulsion of claim 10, wherein R is a methyl radical; L is a hydroxyl group; Q is $CH_2=CR^1COOR^2—$ where $R^1$ is hydrogen and $R^2$ is a propylene radical; x and x' are each 0 or 1; y and y' are each 1 or 2; z and z' are each 0 or 1; b, d and e are 0; the crosslinker is selected from the group consisting of siliconates having the formula $(M^+O^-)_nSi(OH)_{3-n}R'$ or $(M^+O^-)_nSi(OH)_{2-n}R'R''$, where M is individually selected from alkali metal cations, a phosphonium group or an ammonium group; R' is individually selected from the group consisting of divalent hydrocarbon radicals having from 3 to 8 carbon atoms 1 valence attached to the silicon atom and 1 valence attached to a $NH_2$ or $NHR^3$ group where $R^3$ is as defined above, R'' is a monovalent hydrocarbon radical having 1 to 8 carbon atoms, m is a whole or fractional number from 0.1 to 3 and n is a whole or fractional number from 0.1 to 2, $(CH_3O)_2SiCH_3(CH_2)_3SH$ and $H_2NCHCH_3CH_2(OCH_2CHCH_3)_3NH_2$; acceptor groups comprise 0.1 to 10 percent by weight of the organosiloxane polymer and the effective amount of crosslinker is an amount providing a stoichiometric excess of reactive hydrogens relative to the acceptor groups on the organosiloxane polymer.

12. The silicone emulsion of claim 11, wherein the crosslinker is a siliconate having the formula $(M^+O^-)_nSi(OH)_{2-n}R'R''$, where M is $Na^+$ or $K^+$, is an aminopropylene group, R'' is a methyl radical and n is from 0.5 to 1.

13. The silicone emulsion of claim 12, wherein x and x' are each 1; y and y' are each 1; z and z' are each 1; a=0; c is at least 150; there are at least 3 reactive hydrogens per crosslinker molecule; the crosslinker is $NaO(OH)SiCH_3(CH_2)_3NH_2$ or $KO_{0.5}(HO)_{1.5}SiCH_3(CH_2)_3NH_2$; acceptor groups comprise 0.5 to 2 percent by weight of the organosiloxane polymer and the effective amount of crosslinker is an amount providing about a 2 to 20 fold stoichiometric excess of reactive hydrogens relative to the acceptor groups on the organosiloxane polymer.

14. The aqueous silicone emulsion of claim 13 and further comprising a filler.

15. A method of preparing an aqueous silicone emulsion which crosslinks by a Michael addition reaction, yielding a cured composition upon removal of water, comprising:

(A) a dispersed phase comprising an organosiloxane polymer having the general formula

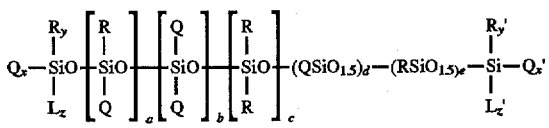

where

R is individually selected from the group consisting of hydrogen, 3,3,3-trifluoropropyl radicals and monovalent hydrocarbon radicals having from 1 to 15 carbon atoms;

L is individually selected from the group consisting of hydrogen, a hydroxyl group, and a hydrolyzable group;

Q is an acceptor group individually selected from the group consisting of $CH_2=CR^1COR^2—$, $CH_2=CR^1COOR^2—$, $CH_2=CR^1ONHR^2—$ and $CH_2=CR^1CR^1=CR^2—$, where $R^1$ is individually selected from the group consisting of hydrogen and monovalent, aliphatic hydrocarbon radicals having from 1 to 15 carbon atoms and $R^2$ is individually selected from the group consisting of divalent hydrocarbon radicals having from 2 to 15 carbon atoms;

x and x' are each positive integers from 0 to 3;

y and y' are each positive integers from 0 to 3;

z and z' are each positive integers from 0 to 3;

x+y+z=3; x'+y'+z'=3;

a is a positive integer from 0 to 10,000;

b is a positive integer from 0 to 10,000;

c is a positive integer from 0 to 20,000;

d is a positive integer from 0 to 10,000;

e is a positive integer from 0 to 10,000;

provided, a+b+c≧100 or d+e>3, and provided further, that there are at least 2 acceptor groups per organosiloxane polymer molecule;

(B) a continuous water phase;

(C) a surfactant; and (D) an effective amount of a crosslinker having sufficient reactive hydrogens per crosslinker molecule or a precursor thereto, the reactive hydrogens being covalently bonded to a nitrogen or sulfur atom of a donor group individually selected from the group consisting of —SH, —NH$_2$ and —NHR$^3$ where $R^3$ is individually selected from the group consisting of monovalent hydrocarbon radicals having from 1 to 15 carbon atoms, the crosslinker being present in the continuous water phase or as a second dispersed phase separate from the dispersed phase containing the organosiloxane polymer, yielding a cured composition upon the removal of water.

16. The method of claim 15 and further comprising the step of adding a filler.

17. The method of claim 15, wherein the crosslinker is present in the continuous water phase and the effective amount of crosslinker is an amount providing at least a stoichiometric equivalent of reactive hydrogens relative to the acceptor groups on the organosiloxane polymer.

18. The method of claim 17, wherein R is a methyl radical; L is a hydroxyl group; Q is $CH_2=CR^1COOR^2$— where $R^1$ is hydrogen and $R^2$ is a propylene radical; x and x' are each 0 or 1; y and y' are each 1 or 2; z and z' are each 0 or 1; b, d and e are 0; the crosslinker is selected from the group consisting of siliconates having the formula $(M^+O^-)_m Si(OH)_{3-m}R'$ or $(M^+O^-)_n Si(OH)_{2-n}R'R''$, where M is individually selected from alkali metal cations, a phosphonium group or an ammonium group, R' is individually selected from the group consisting of divalent hydrocarbon radicals having from 3 to 8 carbon atoms having 1 valence attached to the silicon atom and 1 valence attached to a NH$_2$ or NHR$^3$ group where $R^3$ is as defined above, R" is a monovalent hydrocarbon radical having 1 to 8 carbon atoms, m is a whole or fractional number from 0.1 to 3 and n is a whole or fractional number from 0.1 to 2, $(CH_3O)_2SiCH_3(CH_2)_3SH$ and $H_2NCHCH_3CH_2(OCH_2CHCH_3)_3NH_2$; acceptor groups comprise 0.1 to 10 percent by weight of the organosiloxane polymer and the effective amount of crosslinker is an amount providing a stoichiometric excess of reactive hydrogens relative to the acceptor groups on the organosiloxane polymer.

19. The method of claim 18, wherein the crosslinker is a siliconate having the formula $(M^+O^-)_n Si(OH)_{2-n}R'R''$, where M is Na$^+$ or K$^+$, R' is an aminopropylene group, R" is a methyl radical and n is from 0.5 to 1.

20. The method of claim 19, wherein x and x' are each 1; y and y' are each 1; z and z' are each 1; a=0; c is at least 150; there are at least 3 reactive hydrogens per crosslinker molecule; the crosslinker is $NaO(OH)SiCH_3(CH_2)_3NH_2$ or $KO_{0.5}(HO)_{1.5}SiCH_3(CH_2)_3NH_2$; acceptor groups comprise 0.5 to 2 percent by weight of the organosiloxane polymer and the effective amount of crosslinker is an amount providing about a 2 to 20 fold stoichiometric excess of reactive hydrogens relative to the acceptor groups on the organosiloxane polymer.

21. The method of claim 20 and further comprising the step of adding a filler.

* * * * *